United States Patent [19]

Sutter et al.

[11] Patent Number: 4,836,472

[45] Date of Patent: Jun. 6, 1989

[54] FIRE RETARDANT HELICOPTER DECK

[75] Inventors: R. Frank Sutter, 11747 Sunset Blvd., Los Angeles, Calif. 90049; Melvyn Braithwaite, Singapore, Singapore

[73] Assignee: R. Frank Sutter, Los Angeles, Calif.

[21] Appl. No.: 6,997

[22] Filed: Jan. 27, 1987

[51] Int. Cl.[4] ............................................... B64F 1/00

[52] U.S. Cl. .................................. 244/114 R; 169/54; 114/258

[58] Field of Search ...................... 244/114 R, 114 B; 114/258, 261; 169/54; 404/36

[56] References Cited

U.S. PATENT DOCUMENTS

| | | | |
|---|---|---|---|
| 1,914,573 | 6/1933 | Kookogey | 244/114 R |
| 3,087,693 | 4/1963 | Nicholson et al. | 244/114 B |
| 3,346,219 | 4/1966 | Salyer et al. | 244/114 |
| 4,202,646 | 5/1980 | Herstad | 404/36 |
| 4,420,131 | 12/1983 | Middleton | 244/114 R |
| 4,474,130 | 10/1984 | Birkeland . | |
| 4,541,594 | 9/1985 | Foley | 244/114 |

FOREIGN PATENT DOCUMENTS

| | | | |
|---|---|---|---|
| 886204 | 1/1962 | United Kingdom | 244/114 B |
| 977604 | 12/1964 | United Kingdom | 244/114 R |
| 8600274 | 1/1986 | World Int. Prop. O. | 244/114 X |

*Primary Examiner*—Joseph F. Peters, Jr.
*Assistant Examiner*—Lynn M. Fiorito
*Attorney, Agent, or Firm*—Koppel & Jacobs

[57] ABSTRACT

The present helicopter deck makes use of a passive fire-fighting system. Extruded aluminum beams on a base support an upper platform for supporting the helicopter. The support beams provide a space between the base and the upper platform. The upper platform is a grating, which permits fuel to pass through it. The support beam support batts of thin, spaced strips of high-heat conductive material below the upper platform. The support beams also supports deck plates below and spaced from the batts. The material of the batts conducts localized heat from one location of the batts to a more even, lower temperature spread generally through the batts. The deck plates catch fuel that passes through the batts and slopes to cause the fuel to flow away from the deck.

10 Claims, 3 Drawing Sheets

FIRE RETARDANT HELICOPTER DECK

BACKGROUND OF THE INVENTION

1. Field of the Invention

This invention relates to fire retardant decks for the landing and taking off of helicopters or other vertical takeoff aircraft.

2. Description of the Prior Art

Transportation by helicopter is becoming increasingly important to industry and government. There are large numbers of helicopter landing pads ("helipads") in use throughout the world, not only on land but also on ships and oil drilling rigs. There are over 4000 helipads in the United States alone, of which somewhat less than half are simply circles painted on the ground.

Helipad designers can take many precautionary measures in constructing a helicopter landing pad for maximum safety. The most hazardous portions of helicopter operation are takeoffs and landings. Even if the structural damage to a helicopter is minor in a crash landing on a pad, there is a great risk of fire because of ignition of fuel spilled from the fuel tanks, which are usually located underneath the aircraft. Burning fuel flows onto the landing platform and spreads rapidly to surrounding areas. In such a situation there is an extremely serious danger of harm to personnel and further damage to the helicopter and the landing platform from fire and explosion. What happens immediately after a fuel fire begins determines the ultimate course of the fire and whether the fire may be brought under control.

Active fire-fighting systems for helicopter decks are described in the following patents.

U.S. Pat. No. 4,474,130 (1984) to Birkeland discloses a helicopter deck preferably for use in oil drilling platforms. The periphery of the deck is fitted with a gutter drained by one or more down pipes. Water discharge orifices of a fire extinguishing system are centrally located on the deck. The orifices are supplied with water under pressure for flooding the deck surface, for which control levers are arranged at the periphery of the deck.

U.S. Pat. No. 4,202,646 (1980) to Herstad discloses a helicopter landing platform comprising a fine mesh grid supported on a coarse mesh grid above a horizontal surface such as an ordinary helicopter landing pad. A bottom framework supports the grid structure. Conduits and nozzles for a foam fire extinguishing agent are located in the space between the grid work on top and the framework. Burning fuel flows through the mesh and the foam extinguishes the fire. The mesh prevents the foam from blowing away.

The main disadvantages associated with active fire-fighting systems for helicopter landing pads are complexity, expense, and the need for maintenance to keep them in operational readiness. A helicopter landing deck with an active fire-fighting system is very expensive to construct because the materials are expensive and because the conduits, valves, reservoirs, and other parts form a complicated apparatus to set up. The system must also have regular preventive maintenance to assure that it is always in proper operating order.

SUMMARY OF THE INVENTION

In view of the limitations associated with the prior art, it is an object of this invention to disclose and provide a novel and improved landing deck for helicopters which incorporates a passive fire-fighting system. It is another object of the invention to provide a fire retardant helicopter deck that is significantly less complicated and expensive than the ones in convention use. Yet another object is the provision of a fire retardant helicopter deck that does not require repeated and regular maintenance of its fire-fighting equipment. Another object of the invention is to provide a fire retardant helicopter deck that can be unmanned because the fire-fighting system is completely passive.

The present helicopter deck makes use of a passive fire-fighting system. Extruded aluminum support beams on a base support an upper platform for supporting the helicopter. The support beams are extruded aluminum with a base, a top ledge and an intermediate platform between the base and the top ledge. The support beams provide a space between the base and the upper platform. The upper platform is a grating, which permits fuel to pass through it. A connector attaches the grating to the top ledge of the support beams. The support beams also support batts of thin, spaced strips of high-heat conductive material below the upper platform. The support beams also support deck plates below and spaced from the batts. The material of the batts conducts localized heat from one location of the batts to a more even, lower temperature spread generally through the batts. The deck plates catch fuel that passes through the batts. The deck plates slope to peripheral gutters.

Any fire is extinguished because the aluminum metal-foil material conducts heat away from the fire. The batts also restrict airflow.

These and other features and advantages of the invention will be apparent to those skilled in the art from the following detailed description of a preferred embodiment.

DETAILED DESCRIPTION OF A PREFERRED EMBODIMENT

Figure 1:
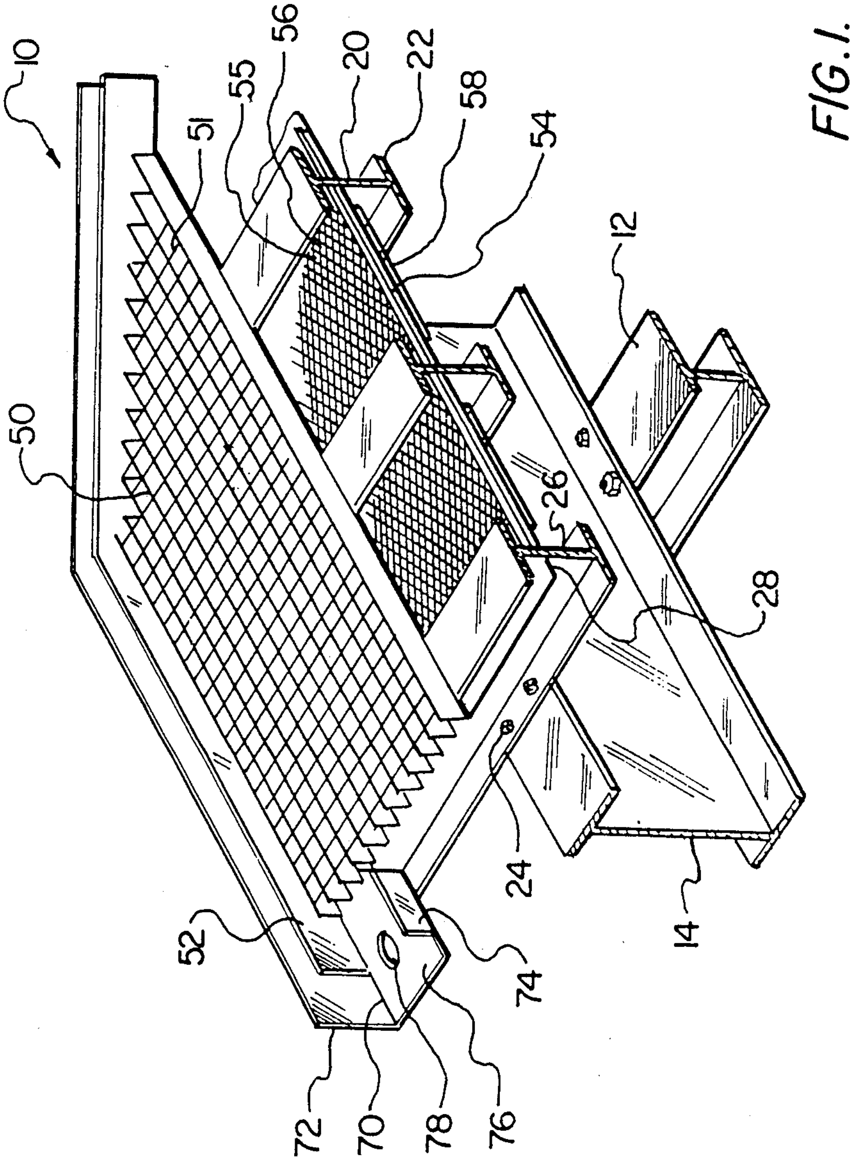
FIG. 1 is a perspective view of a cutaway portion of the fire retardant helicopter deck of the present invention.

The helicopter pad of the present invention comprises several distinct components. As is common, pad 10 is octagonal (FIG. 2) The pad rests on a base. In the exemplary embodiment, the base comprises I-beams 14 (only one of which is shown in FIG. 1) on and at a right angle to I-beams 12. Fasteners 16 (FIG. 1) hold the beams together. The bottom beams 12 are part of a pre-existing structure such as a building roof, an offshore drilling platform or a ship.

A plurality of support members are mounted on the base. In the exemplary embodiment, support members 20 are extruded aluminum beams, which have a shape in cross-section shown in FIG. 3. Each support beam 20 has a base 22, which is fastened to the top of cross-beam 14 by bolts 24 (FIG. 1). Central vertical web 26 extends upward from base 22. Intermediate support platforms 28 and 30 extend outward from central web 26. Platforms 28 and 30 each have an outer region, which comprises an outer sloping surface 31, 32 (FIG. 3) that leads to recessed, horizontal extension 33, 34. Slots 35, 36 extends upward and outward from each end of the platform. The sloping surface, horizontal surface and slot extend outward and slightly below horizontal surfaces 37 and 38.

Upper horizontal ledges 40 and 42 (FIG. 3) extend outward from the top of central web 26. The underside of each ledge has slot 43, 44.

Aluminum support beams 20 are parallel and are spaced apart approximately 0.5 m in the exemplary embodiment. The support beams must be sufficiently close together to support the weight of a helicopter or any other vertical take-off and landing aircraft especially during a crash. Aluminum is used because it is light weight, is relatively strong per unit mass and can be extruded. Other appropriate alloys and materials can be substituted for the aluminum.

Figure 3:
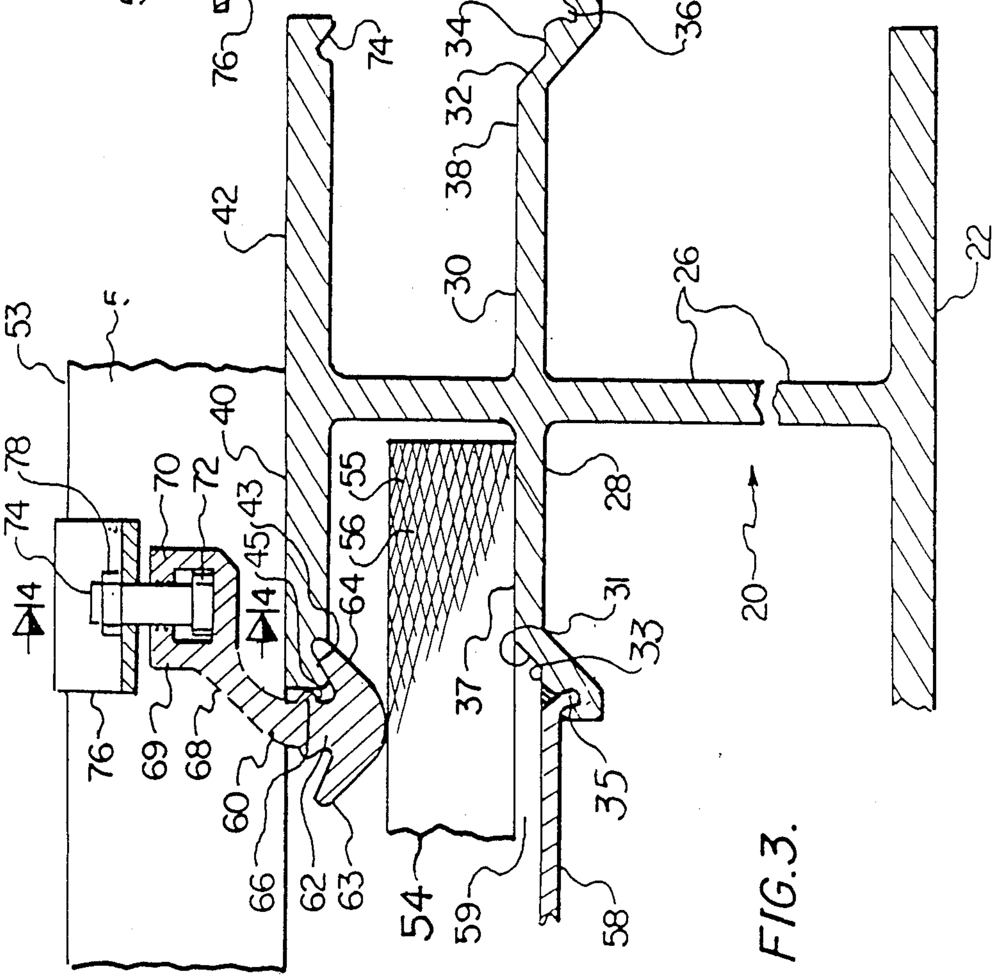
FIG. 3 is a cross-sectional end view of one of the support members and the parts it supports of the fire retardant helicopter deck of the present invention.

Connector member 60 (FIGS. 3 and 4) attaches an upper platform 50 to the top of support beams 20. The upper platform is an aluminum grating of the type shown in FIG. 1 in the exemplary embodiment, which permits liquids such as fuel to pass through it. Connector member 60 has a bottom, anchor-shaped portion 62 with two arms 63 and 64. Arm 64 is shaped to correspond to slot 43 in ledge 40 (FIG. 3), and arm 63 could fit into slot 44 in the other ledge 42 (not shown). FIG. 3 only shows one connector 60, but the exemplary embodiment uses connectors spaced along support member 20 and staggered between the two ledges 40 and 42. Knob 66 abuts outer surface 45 of ledge 40.

Figure 4:
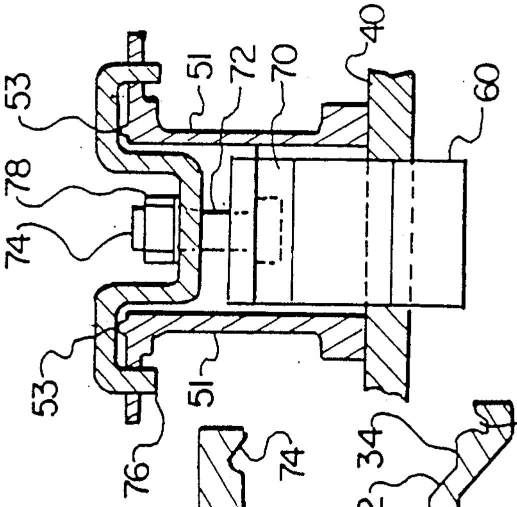
FIG. 4 is a sectional view taken through plane 4—4 of FIG. 3 and shows the connector holding the grating to the support members.

The upper portion 68 of connector member 60 has two vertical arms 69 and 70. Walls 51 of grating 50 rest on and extend up from ledges 40 and 42 (FIGS. 3 and 4). Vertical arms 69 and 70 hold bolt 72 to connector 60. The top 74 of the bolt extends through clip 76. Nut 78 holds the clip in place. The clip extends over the top 53 of two adjacent grating walls 51 (FIG. 4). The numerous connectors spaced about the tops of support members 20 secure enough locations of the grating to the rest of the deck structure.

A kick plate 52 (FIG. 1) connects to the tops of support beams 20 around the outer edge of the grating 50 to indicate the outer edge of the deck.

Filler means are supported between base 14 and upper platform 50. The filler means in the preferred embodiment is a material sold under the trademark Explofoil. Explofoil is made of very thin foil aluminum alloy 55 that is slit and expanded to form webs 56 of hexagonally shaped openings, then layered to form an open-celled batt 54 (FIGS. 1 and 3). The expanded aluminum foil batts 54 are 30 mm thick, 60 mm wide, and 500 mm long in the exemplary embodiment.

Basin means in the form of deck plates 58 are mounted below the filler means. Mounting means on the support members 20 support batts 54 of the filler means and deck plates 58. As FIG. 3 shows, batts 54 rest on surfaces 37 and 38 of platforms 28 and 30. Deck plates 58 extends outward towards horizontal extensions 33 and 34. The deck plates may have a tongue to engage groves 35 and 36, or the deck plates may be welded in place at weld 39.

Deck plates 58 should slope to the outer edge of the deck. Support beams 20 are somewhat flexible over their long length. Appropriate shims (not shown) may provide the proper slope. A slope ratio of 1:300 should be sufficient for fuel drainage. The grating 50 can accomodate the small slope.

Figure 2:
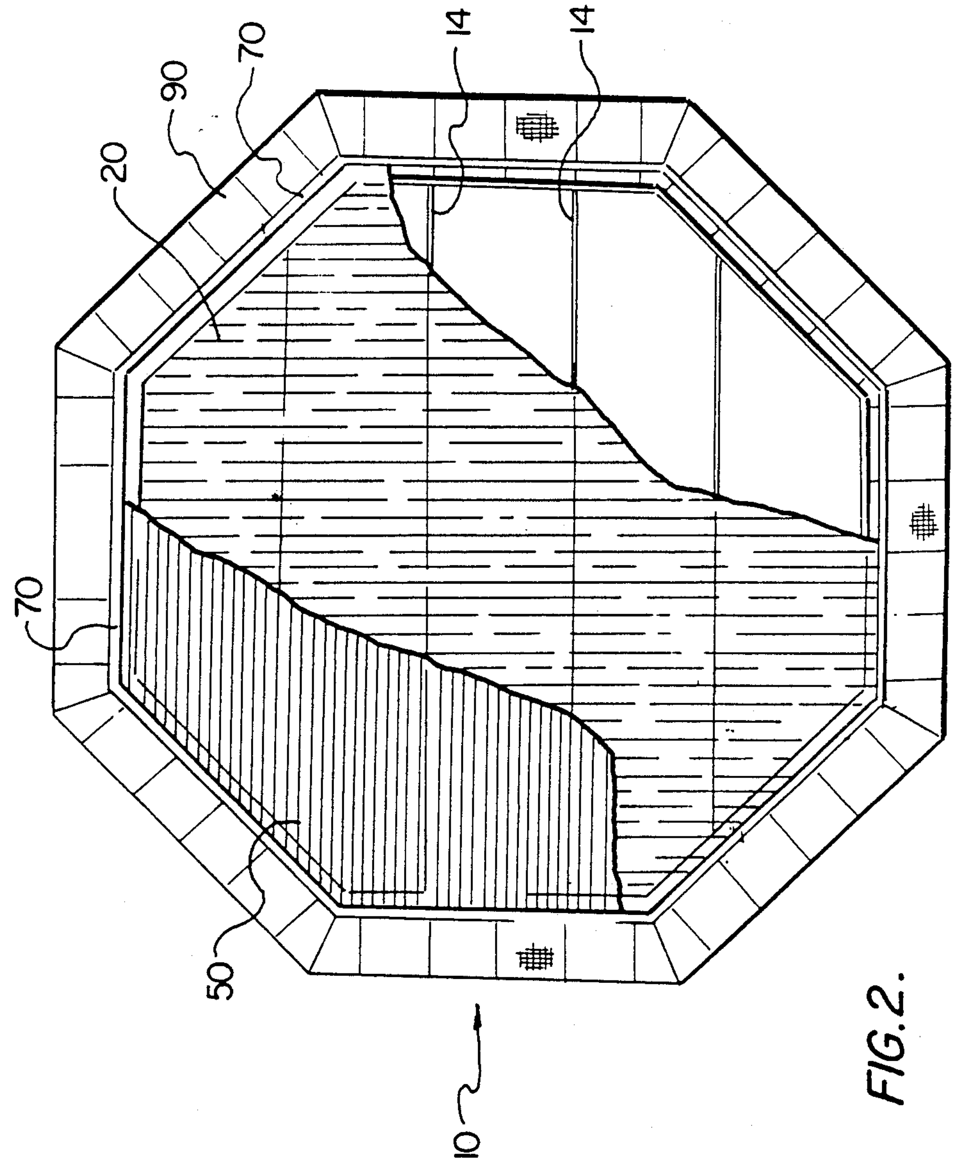
FIG. 2 is a plan view, partially cutaway, of the fire retardant helicopter deck of the present invention.

A gutter 70 is attached to support members 20 along the outer edge of the deck (FIGS. 1 and 2). Gutter 70 comprises an outer wall 72, a shorter inner wall 74 spaced on base 76. One or more holes 78 in the bottom wall of the gutter allows fuel accumulating in the gutter to drain downward, away from the deck. Appropriate collectors (not shown) attach to the holes.

As FIG. 3 shows, batt 54 is spaced slightly above deck plate 58 so that there is a short region 59 below batt 54 on which fuel can flow along the top of deck plate 58.

Safety net 90 surrounds the octagonally shaped deck (FIG. 2). The net is inclined upward 12.6° from the surface of grating 50. Such safety nets and corresponding means for attaching them to the deck are known in the helicopter pad art.

The helicopter deck of the present invention functions as a passive firefighting system in the following manner. Any fuel that spills onto grating 50 flows through it into porous batts 54 and then to the deck plates 58. Because the deck plates are sloped toward the outer edges of the deck, fuel that reaches the deck plates is drained into gutter 30 and accumulated fuel in the gutter is drained out.

Any fuel that is spilled on deck 50 flows quickly through the grating. If the fuel ignites, the rapid flow of fuel through the grating away from the helicopter or other objects on the grating minimizes the amount of fuel available for combustion on the deck. The fuel that flows down from grating 50 then reaches batt 54. At this point the fuel is still ignited. As the fuel reaches the batts, however, ignition is suppressed because the thin aluminum foil transmits the heat generated during combustion throughout the batt where it dissipates rapidly. As the material transmits the heat away from the region where fuel is burning, the fuel falls below its ignition temperature. The structure of the batt also inhibits the flow of air through the batt so that wind or convection currents cannot drive combustion. High winds are often a problem on off-shore oil platforms, where, for example in the North Sea winds exceed twenty knots (37 km/hr) 37% of the time. If fire retardant foam is used, the batting material tends to trap the foam and prevent the wind from blowing it away.

The cooled fuel then drips onto deck plate 58. Even if the fuel is still burning at this point, the batting tends to remove the heat of combustion from the region around the burning fuel to minimize damage. The relatively closely spaced support members 20 (FIG. 1) also tend to keep the burning region localized. Fuel that spills between two adjacent support members 20 can flow between those members, but it cannot flow to regions between adjacent members.

A scaled-down version of the helicopter deck of the present invention was tested. A tray-like metal frame approximately 2 m×2 m×20 cm deep had three parallel pipes in the bottom to serve as supports for a metal grating. Explofoil batts were laid on the bottom of the tray in the trough-like spaces between the bottom of the tray and the grating, between the support pipes. Aviation fuel was poured on the top grating and ignited.

The initial flaring of the burning fuel reached a peak in intensity approximately ten seconds after ignition. The flames diminished after thirty seconds and were practically extinguished after fifty seconds. After sixty seconds the fire was 90% out.

When the fire was completely extinguished, the grating was cool enough so that someone with shoes on could stand on the grating. The batts and the other structure was not damaged. Large pools of unburned fuel has collected below the batts. Of course, gutter 70 of the present invention would drain the pools away. One could handle the batts seventy seconds after the fire had been started; they were only warm to the touch. The metal bottom of the test tray, corresponding to the invention's deck plate, was cool. The grating was still too hot to handle with bare hands 120 seconds after the ignition of the spilled fuel.

A preferred embodiment of a novel and improved fire retardant helicopter deck which is a highly effective safety installation for helicopter landings and takeoffs has thus been shown and described. Numerous modifications and alternative embodiments will occur to those skill in the art.

We claim:

1. In a helicopter landing deck comprising a base, a plurality of support members on the base, and an upper platform for supporting the helicopter, the support members providing a space between the base and the upper platform, the upper platform comprising a grating which permits liquid fuel to pass through it, the improvement comprising the provision of:

filler means between the base and the upper platform, basin means below the filler means, and mounting means on the support members for supporting the filler means and the basin means in the space below the upper platform, the filler means comprising spaced-apart layers of high-heat conductive material for permitting liquid fuel passing through the upper platform to pass through the filler means, the material of the filler means dissipating localized heat from the fuel at one location of the filler means by conducting said heat to a more even, lower temperature spread generally through the filler means, and thereby passively suppressing combustion of the fuel, the basin means catching liquid fuel that passes through the filler means.

2. The helicopter landing deck of claim 1, said filler means comprising a matrix of webs of shaped openings layered to form an open-celled batt.

3. The helicopter landing deck of claim 2, said grating comprising a matrix of openings which are larger than the openings of said batt.

4. In a helicopter landing deck comprising a base, a plurality of support members on the base, and an upper platform for supporting the helicopter, the support members providing a space between the base and the upper platform, the upper platform comprising a grating which permits liquid to pass through it, the improvement comprising the provision of:

filler means between the base and the upper platform, basin means below the filler means, and mounting means on the support members for supporting the filler means and the basin means in the space below the upper platform, the filler means comprising spaced-apart layers of high-heat conductive material for permitting liquid passing through the upper platform to pass through the filler means, the material of the filler means conducting localized heat from one location of the filler means to a more even, lower temperature spread generally through the filler means, the basin means catching liquid that passes through the filler means, each support member having a support base, an upright web extending upward from the base, intermediate support platforms extending outward from the upright web above the base of the support member, and an upper ledge member at the top of the upright web.

5. In the helicopter landing deck of claim 4, the improvement further comprising the provision of each intermediate support platform having an outer region which comprises an outer sloping surface and a recessed, horizontal extension, the basin means having side edges, the side edges of the basin means being supported on the horizontal extension of the intermediate support platform.

6. In the helicopter landing deck of claim 5, the improvement further comprising the provision of the filler means being mounted on the intermediate support platforms and extending towards the central web of the support member beyond the outer sloping surface above the basin means.

7. In a helicopter landing deck comprising a base, a plurality of support members on the base, and an upper platform for supporting the helicopter, the support members providing a space between the base and the upper platform, the upper platform comprising a grating which permits liquid to pass through it, the improvement comprising the provision of:

filler means between the base and the upper platform, basin means below the filler means and mounting means on the support members for supporting the filler means and the basin means in the space below the upper platform, the filler means comprising spaced-apart layers of high-heat conductive material for permitting liquid passing through the upper platform to pass through the filler means, the material of the filler means conducting localized heat from one location of the filler means to a more even, lower temperature spread generally through the filler means, the basin means catching liquid that passes through the filler means, and gutter means around the periphery of the deck connected to the basin means for receiving liquid that flows off the basin means.

8. A helicopter landing pad comprising:

a. a grating;

b. a plurality of parallel, spaced deck beams underlying and attached to the grating for supporting the grating;

c. a deck plate extending between each adjacent deck beam to form a plurality of troughs between adjacent deck beams, and platform means on the deck beams for supporting the deck plates below the grating;

d. a plurality of fire retardant batts disposed between adjacent deck beams and substantially covering the deck plates for receiving liquid fuel spilled through the grating, said batts spreading and thereby dissipating heat from said fuel to passively suppress combustion thereof; and e. the platform means further comprising means for supporting the batts above the deck plates.

9. The helicopter landing pad of claim 8, said batts restricting the lateral flow of air to said liquid fuel.

10. The helicopter landing pad of claim 8, said batts comprising open-celled structures, and said grating comprising a matrix of openings which are larger than the openings of said batts.

* * * * *